Oct. 23, 1962     L. J. REICKS     3,059,505
PORTABLE SPEED ADAPTER FOR POWER TAKE-OFF SYSTEMS
Filed June 2, 1958     2 Sheets-Sheet 1
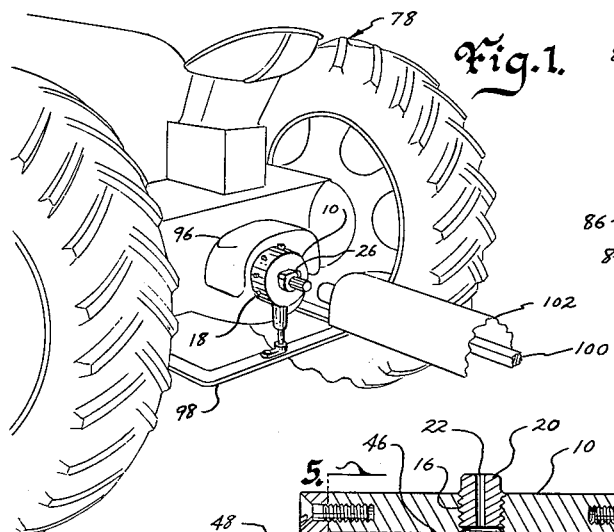
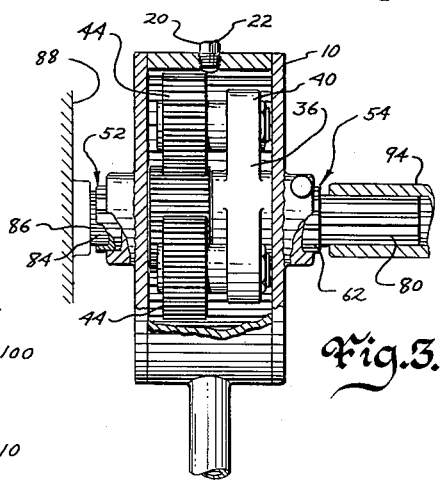
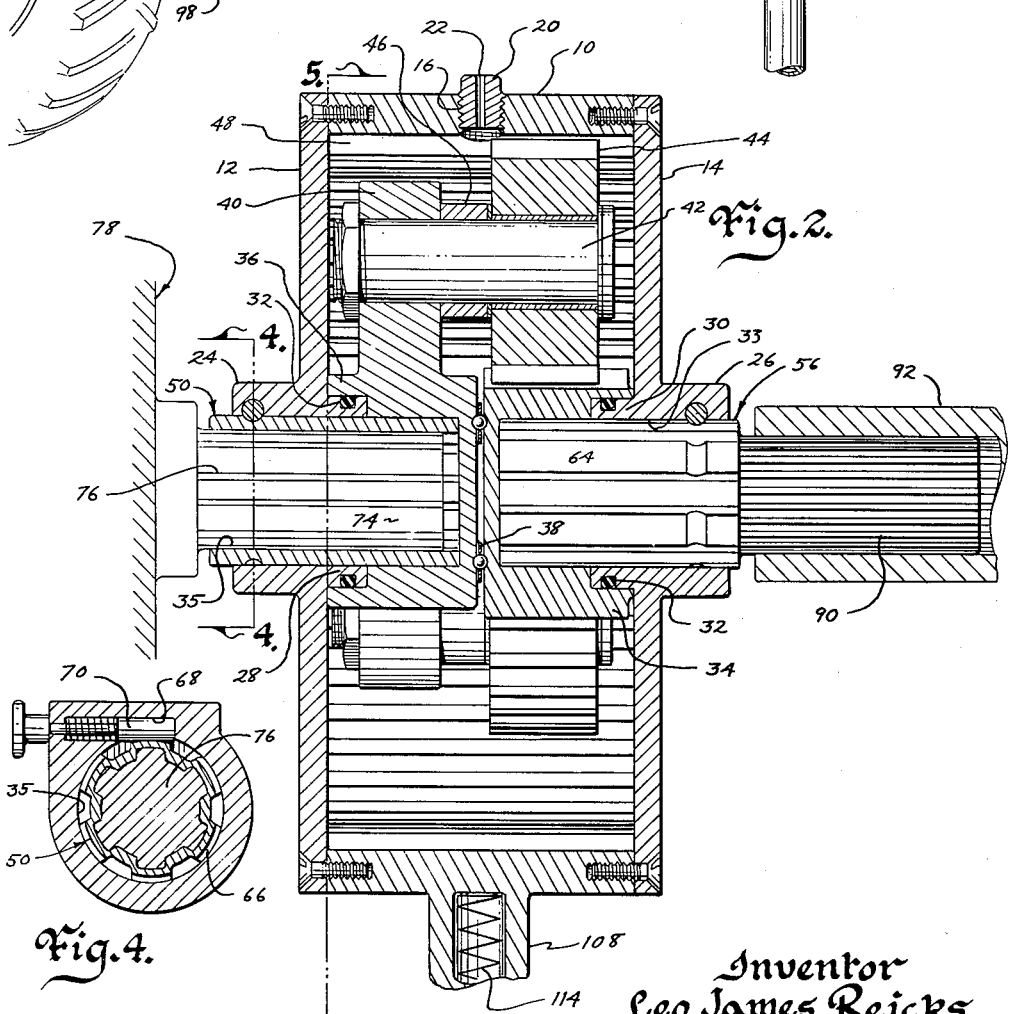
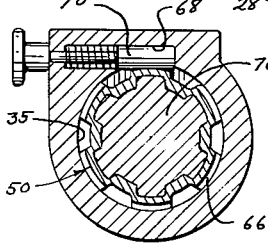
Inventor
Leo James Reicks
by Donald H. Zarley
Attorney
Witness
Edward P. Seeley

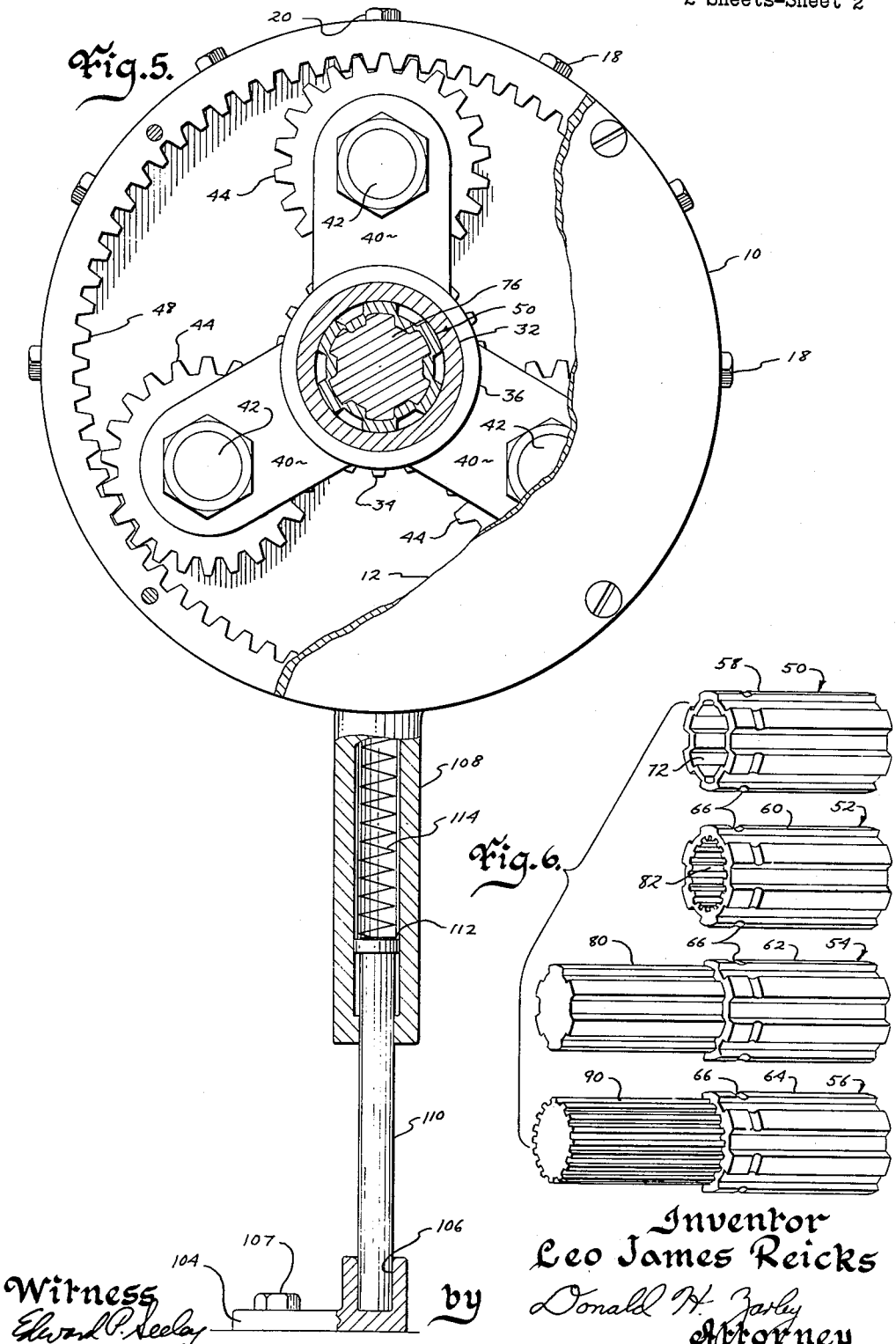

United States Patent Office 3,059,505
Patented Oct. 23, 1962

3,059,505
PORTABLE SPEED ADAPTER FOR POWER
TAKE-OFF SYSTEMS
Leo James Reicks, Hawkeye, Iowa
Filed June 2, 1958, Ser. No. 739,406
2 Claims. (Cl. 74—801)

My invention relates to power take-off systems of tractors and the like, and more particularly, to a means for adapting a given power take-off apparatus to machines having different speed ratings.

Until recent times, the specifications on power take-off systems in the farm tractor art have been substantially uniform. Most farm tractors deliver approximately 535 r.p.m.'s to the power take-off shaft at maximum horsepower and the various farm machines are also geared to operate within this speed range. The farm implements generally have a power shaft which has an internally splined female adapter which is capable of receiving the externally splined power take-off shaft of the tractor. The power take-off shafts and female adapter generally present six splines on their external and internal surfaces, respectively.

It has been ascertained that the wear on universal joints and the like decreases as the speed of the shafts attached thereto is increased. In an effort to take advantage of this phenomena, the American Society of Agricultural Engineers has recently adopted new uniform specifications for power take-off systems. The new r.p.m. rating for farm tractor power take-off systems is 1000. The number of splines for these new power take-off shafts has been increased from six to twenty-one. Obviously, the r.p.m. ratings on new farm implements are being similarly changed as are the number of splines inside the female adapter on the power shafts of the implements.

The greatest problems posed by this change in power take-off specifications is how to operate an "old" machine with a "new" tractor and vice versa. Obviously, the number of splines on old and new machinery and tractors must be reconciled as well as the difference in power and speed.

Therefore, the principal object of my invention is to provide means which can be easily and quickly installed to reconcile the differences in speed ratings and number of splines between the above described "new" tractors and "old" machines, and between "old" tractors and "new" machines.

A further object of my invention is to provide a portable speed adapter for power take-off systems that consumes very little space.

A still further object of by invention is to provide a portable speed adapter for power take-off systems that can be adapted for use on tractors and machinery having superstructures of varying descriptions.

A still further object of my invention is to provide a portable speed adapter for power take-off systems that is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of the rearward end of a tractor upon which my device has been installed. This figure also shows the power shaft of a farm machine in a position just before being secured to my device;

FIG. 2 is a partial sectional view taken along the longitudinal axis of my device when mounted between an old tractor and a new machine;

FIG. 3 is a sectional view similar to that of FIG. 2 except that FIG. 3 shows my device mounted between a new tractor and an old machine;

FIG. 4 is a sectional view of my device taken on line 4—4 of FIG. 2;

FIG. 5 is a partial sectional view of my device taken on line 5—5 of FIG. 2; and FIG. 6 is a schematic perspective view of the adapters used in my device.

I have utilized a conventional planetary gear train in my device and it is understood that my device should not be limited to the particular planetary gear train system disclosed therein. I have used the numeral 10 to designate the circular gear housing with side walls 12 and 14. Housing 10 may have a plurality of holes 16 in its periphery communicating with the exterior thereof. Plugs 18 are threadably inserted into holes 16 and plug 20 is pierced with a vent hole 22.

Circular shoulders 24 and 26 extend outwardly from the centers of side walls 12 and 14, respectively. Bearing shoulders 28 and 30 extend inwardly from these same respective side walls and shoulders 24, 26, 28 and 30 all have the same internal diameter. It should be further noted that the internal diameters of these shoulders are smooth and not equipped with splines. Bearing shoulders 28 and 30 each are equipped with sealing ring assemblies 32.

As shown in FIG. 2, sun gear 34 is rotatably mounted on bearing shoulder 30, and spider element 36 is rotatably mounted on bearing shoulder 28. Sealing gasket 38 separates the inner ends of sun gear 34 and spider element 36. Spider element 36 has three radially extending arms 40. A shaft 42 is mounted on the outer ends of arms 40 and these shafts extend laterally from the arms toward the opposite side of the gear housing 10. Planetary gears 44 are rotatably mounted on the ends of shafts 42 opposite from arms 40 and spacer element 46 separate the arms 40 from their respective gears 44. The interior surface of gear housing 10 presents internal gear teeth 48. These gear teeth 48 are shown to be an integral part of gear housing 10 but this arrangement is optional, depending upon the predetermined planetary gear train to be used. Planetary gears 44 are of sufficient diameter to mesh with the internal gear teeth 48 and the teeth of sun gear 34, as shown in FIG. 2.

Sun gear 34 and spider element 36 have internal core openings 33 and 35, respectively, of the same size and which presents the same number of splines. FIG. 6 shows four adapters 50, 52, 54, and 56. Each of these adapters has externally splined surface 58, 60, 62 and 64, repectively, which are adapted to be received into the internally splined core openings of the sun gear 34 and spider element 36. Each of the splined surfaces 58, 60, 62 and 64 of the above described adapters has a semi-circular groove 66 extending around the periphery of its splines. The shoulders 24 and 26 each have an elongated slot 68 which communicates tangentially with the interior of the shoulders. Spring-loaded pins 70 are mounted within slots 68 and are adapted to yieldingly hold the adapters against longitudinal movement when the grooves 66 are registering with tthe slots 68. The is merely a conventional means of securing the adapters in place and it is not my intention to limit my invention to the exact structure of pins 70.

Adapter 50 is hollow and has an internally splined surface 72 which coincides with the conventional externally splined surface 74 of the power take-off shaft 76 on the "old" tractor 78 shown in FIG. 2.

Adapter 54 has a portion 80 on one of its ends which is externally splined in conformity with the old tractor power take-off shaft 76 and the internally splined portion 72 on adapter 50.

Adapter 52 is the same as adapter 50 except that adapter 50 has an internally splined surface 82 which coincides with the conventional externally splined surface 84 of the power take-off shaft 86 on the "new" tractor 88 shown in FIG. 3.

Adapter 56 has a portion 90 on one of its ends which is externally splined in conformity with the new tractor power take-off shaft 86 and the externally splined portion 82 of adapter 52.

Let it be assumed that the sun gear 34, the planetary gears 44 and the internal gear teeth 48 are of such size and ratio that the rotation of the spider element at 535 r.p.m. will result in the sun gear rotating at the speed of 1000 r.p.m., and vice versa. With this characteristic of the planetary gear train predetermined, FIG. 2 shows adapter 50 mounted on the power take-off shaft 76 of old tractor 78 and the same adapter is simultaneously mounted within spider element 36. FIG. 2 shows also the splined portion 64 of adapter 56 mounted within sun gear 34. The splined portion 90 of adapter 56 is shown to extend outwardly from the sun gear 34 to be mounted within the internally splined female socket 92 which is operatively connected to the power shaft of a "new" machine.

FIG. 3 shows the position of my gear housing 10 reversed 180 degrees with respect to that of FIG. 2. In FIG. 3, adapter 52 is shown to be mounted on power take-off shaft 86 of "new" tractor 88. Adapter 52 is also mounted within the core opening 33 of sun gear 34. This figure also shows splined portion 62 of adapter 54 mounted within spider element 36 and portion 80 of this adapter extends outwardly from spider element 36 to be received within the female socket 94 which in turn is mounted on the power shaft of an "old" machine.

In FIG. 1, I have shown an "old" tractor 78 having a conventional power take-off shield 96 and draw bar 98. A power shaft 100, which is usually telescopic, of a "new" machine is shown to be in position of near attachment to my device and a portion of a very conventional telescopic shield 102 is shown to be covering shaft 100. A bracket 104 is secured to drawbar 98 by bolt 107. Bracket 104 can be located anyplace on the tractor as long as it dwells in a plane passing through the center of gear housing 10 and parallel to side 12 and 14. Bracket 104 should have a well opening 106 as shown in FIG. 5.

A hollow elongated arm extends radially from the center of gear housing 10 and rod 110 telescopically extends from the lower end thereof. Flange 112 on the upper end of rod 110 prevents the rod from being separated from the arm 108. A spring 114 in arm 108 yieldingly urges rod 110 outwardly. As shown in FIG. 5, the lower end of rod 110 is adapted to be received at times in well opening 106 of bracket 104.

The normal operation of my device is as follows: My device will normally have no adapters within spider element 36 and sun gear 34. If it is desired to operate a "new" piece of machinery with an "old" tractor, the adapter 50 is placed on the power take-off shaft 76 of "old" tractor 78. Pin 70 in shoulder 24 is momentarily withdrawn and my whole unit is then mounted on shaft 76 and adapter 50 by inserting the adapter 50 and shaft 76 into spider element 36, as shown in FIG. 2. The release of pin 70 will prevent the gear housing 10 from moving longitudinally with respect to adapter 50. Bracket 104 is then located somewhere on the tractor as discussed above so that it can receive the lower end of rod 110 into well opening 106. Bracket 104 can then be permanently left on the tractor and the ability of rod 110 to telescopically move within the arm 108 automatically compensates for any variation of the position of bracket 104 on different tractors. Spring 114 obviously yieldingly holds rod 110 within well opening 106 of bracket 104. The merging of rod 110 and bracket 104 holds gear housing 10 against rotation which is a necessity in the operation of the planetary gear train. The radial alignment of arm 108 in gear housing 10 helps to maintain the balance of the unit.

The gear housing interior 10 is filled with a suitable lubricant (not shown). Plug 20 with vent hole opening 22 is designed to permit some expansion of the lubricant when becoming heated. However, plug 20 must always be at the top of the gear housing 10 to prevent leakage so plug 20 will have to be interchangeable with one of the plugs 18 after the position of arm 108 and bracket 104 have determined where the top of the housing will be.

As again shown in FIG. 2, the portion 64 of adapter 56 can be inserted into the core opening 33 of sun gear 34 by manipulating pin 70 in shoulder 26. The female socket 92 on the power shaft 100 of the new machine can then be moved upon the portion 90 of adapter 56 to complete the connection between tractor and machine. Obviously, the adapters 50 and 56 could be positioned in a different time sequence than described above without changing the effect of the positioning. With this connection between adapter 54 can be inserted into spider element 36 and portion 80 of the adapter can be received within the female socket of the power shaft on the old machine. This completed connection will permit the high speed of rotation of the "new" tractor power take-off shaft 86 to deliver a reduced speed to the female socket 94 of the old machine because of the built-in gear ratios of the planetary gear train. This arrangement of structure in FIG. 3 is a complete reversal of the phenomena shown in FIG. 2.

From the foregoing, it can be seen that once bracket 104 is permanently located on a given tractor or tractors my device can be almost instantaneously placed into operation with no difficulty. It is therefore apparent that my invention will accomplish at least all of its stated objectives.

Some changes may be made in the construction and arrangement of my portable speed adapter for power take-off systems without departing from the real spirit and purpose of my invention, and it is my intention to cover by my claims, any modified forms of structure or use of mechanical equivalents which may be reasonably included within their scope.

I claim:

1. In a portable speed adapter for power take-off systems, a housing, a first member rotatably mounted in said housing, a second member rotatably mounted in said housing, said first member comprising a spider element with radially extending arms, planetary gears rotatably secured to the outer ends of said arms, stationary gear teeth on the interior perimeter surface of said housing, said planetary gears being meshed with said gear teeth, said second member comprising a sun gear, said sun gear being in meshed movable engagement with said planetary gears, whereby said first and second members are drivingly engaged together and are capable of being simultaneously rotated at different speeds, and said first and second members having core openings of the same size and shape communicating with the outside of said housing, a first adapter element detachably secured within one of said core openings and a second adapter element detachably secured within the other of said core openings, said first adapter element extending outside of said housing, the portion of said first adapter which extends outside of said housing being rigidly and permanently secured to the portion of said first adapter inside said housing and being constructed out of the same piece of material, and internal splines within said second adapter element; external splines on the portion of said first adapter extending outside said housing and being of different size and number than said internal splines within said second adapter element; the portion of said first adapter inside said housing being externally splined and having a diameter greater than the portion of said first adapter outside said housing.

2. In a portable speed adapter for power take-off systems, a housing, a first member rotatably mounted in said housing, a second member rotatably mounted in said housing, said first member comprising a spider element with radially extending arms, planetary gears rotatably secured to the outer ends of said arms, stationary gear teeth on the interior perimeter surface of said housing, said planetary gears being meshed with said gear teeth, said second member comprising a sun gear, said sun gear being in meshed movable engagement with said planetary gears, whereby said first and second members are drivingly engaged together and are capable of being simultaneously rotated at different speeds, and said first and second members having internally splined core openings of the same size and shape communicating with the outside of said housing, a first externally splined adapter element detachably secured in one of said core openings and a second externally splined adapter element detachably secured within the other of said core openings, said first adapter element extending outside of said housing, the portion of said first adapter which extends outside of said housing being rigidly and permanently secured to the portion of said first adapter inside said housing and being constructed out of the same piece of material, and internal splines within said second adapter element; said external splines on the portion of said first adapter extending outside said housing being of different size and number than said internal splines within said second adapter element; the portion of said first adapter inside said housing being externally splined and having a diameter greater than the portion of said first adapter outside said housing.

References Cited in the file of this patent

UNITED STATES PATENTS

| | | | |
|---|---|---|---|
| 908,255 | Hardman | | Dec. 29, 1908 |
| 1,522,068 | Morgan | | Jan. 6, 1925 |
| 2,209,120 | Hoffman | | July 23, 1940 |
| 2,587,838 | Green | | Mar. 4, 1952 |
| 2,606,472 | Curtis et al. | | Aug. 12, 1952 |

FOREIGN PATENTS

| | | | |
|---|---|---|---|
| 23,996 | Great Britain | | Oct. 18, 1897 |
| 349,272 | Great Britain | | May 28, 1931 |
| 652,626 | Germany | | Nov. 3, 1937 |